US011175529B2

(12) United States Patent
Nugraha et al.

(10) Patent No.: US 11,175,529 B2
(45) Date of Patent: Nov. 16, 2021

(54) BRIDGED MICRO LOUVERS FOR ACTIVE PRIVACY SCREEN

(71) Applicant: INTEL CORPORATION, Santa Clara, CA (US)

(72) Inventors: Thomas A. Nugraha, Tokyo (JP); Dong Yeung Kwak, San Jose, CA (US); Jue Li, Shanghai (CN); Chieko Uemizu, Ageo (JP)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/751,711

(22) Filed: Jan. 24, 2020

(65) Prior Publication Data

US 2020/0159067 A1 May 21, 2020

Related U.S. Application Data

(63) Continuation of application No. 16/328,914, filed as application No. PCT/CN2016/101126 on Sep. 30, 2016, now Pat. No. 10,578,912.

(51) Int. Cl.
| | |
|---|---|
| G02F 1/1335 | (2006.01) |
| G06F 21/84 | (2013.01) |
| G06F 3/041 | (2006.01) |
| G02F 1/1347 | (2006.01) |
| G02F 1/1334 | (2006.01) |
| G06F 13/40 | (2006.01) |
| G02F 1/1333 | (2006.01) |

(52) U.S. Cl.
CPC ...... *G02F 1/133524* (2013.01); *G02F 1/1334* (2013.01); *G02F 1/1347* (2013.01); *G02F 1/13476* (2013.01); *G06F 3/041* (2013.01); *G06F 13/4027* (2013.01); *G06F 21/84* (2013.01); *G02B 2207/123* (2013.01); *G02F 1/13338* (2013.01); *G06F 3/0412* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 2010/0288639 | A1* | 11/2010 | Wang | G03G 17/04 204/483 |
| 2015/0378235 | A1* | 12/2015 | Lin | G02F 1/167 359/296 |
| 2016/0077363 | A1* | 3/2016 | Shiota | G02F 1/1323 349/61 |
| 2019/0100853 | A1* | 4/2019 | Shiota | G02F 1/1681 |

* cited by examiner

*Primary Examiner* — Richard H Kim
(74) *Attorney, Agent, or Firm* — Kacvinsky Daisak Bluni PLLC

(57) ABSTRACT

Disclosed herein are techniques related to privacy at display devices. The techniques include an apparatus having an electroactive privacy layer of a display device. The electroactive privacy layer is configured to restrict a propagation direction of light emission associated with a display layer of the display device. The restriction of propagation is generated by micro louvers formed in the electroactive privacy layer.

18 Claims, 15 Drawing Sheets

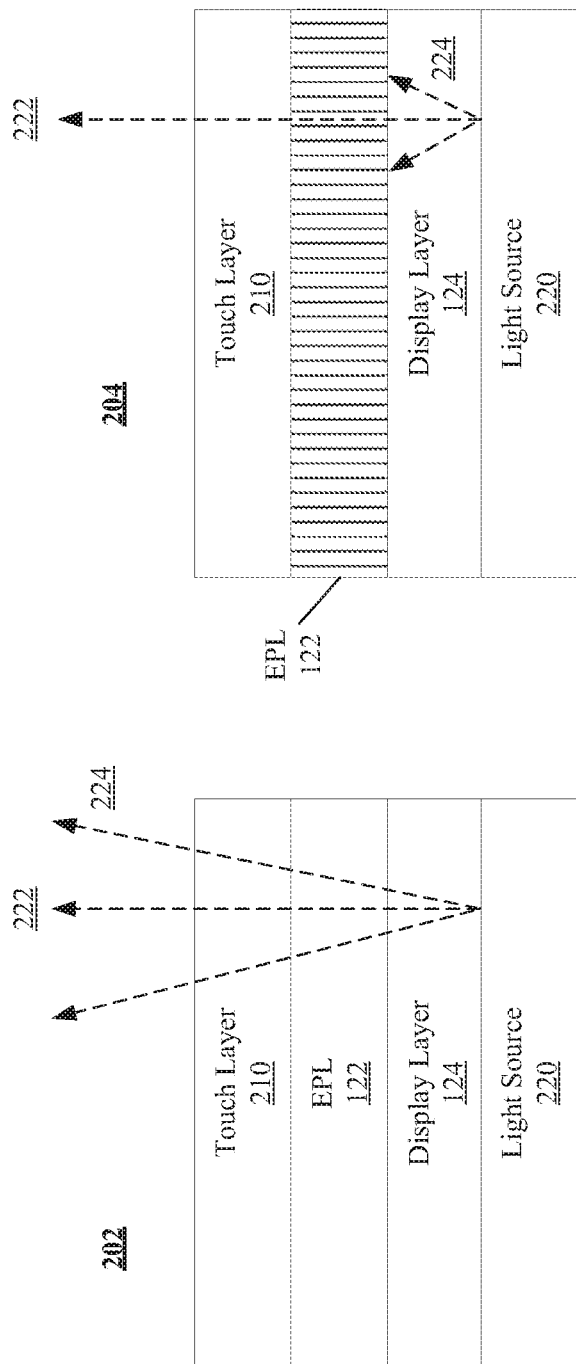

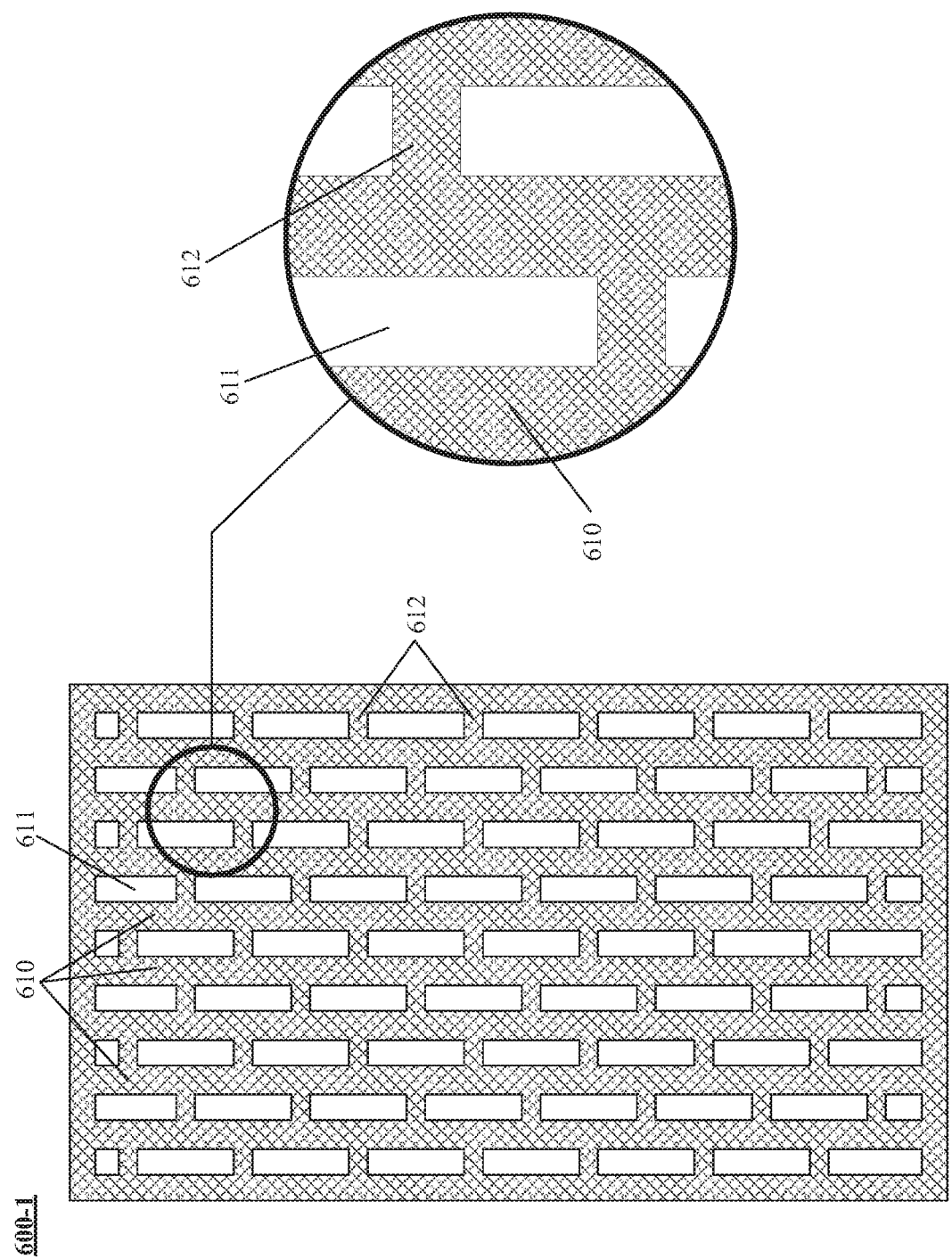

900

Identify a condition to activate a privacy mode or a transparent mode of a display device.
910

Send a control signal, based on the identified condition, to a voltage source to cause the voltage source to apply a voltage to first electrodes disposed parallel to each other and electrically coupled at a plurality of points via a number of bridges to create a potential difference between the first electrodes and a second electrode, the first electrodes and the second electrode disposed in an electroactive privacy layer of a display device, the potential difference to form a plurality of micro louvers in a dielectric material disposed between the first electrodes and the second electrode, the plurality of micro louvers to restrict a propagation direction of light emission associated with the display device.
920

FIG. 9

BRIDGED MICRO LOUVERS FOR ACTIVE PRIVACY SCREEN

CROSS-REFERENCE TO RELATED APPLICATIONS

This application is a continuation of, claims the benefit of and priority to previously filed U.S. patent application Ser. No. 16/328,914 filed Feb. 27, 2019, entitled "BRIDGED MICRO LOUVERS FOR ACTIVE PRIVACY SCREEN", which is a national stage application claiming the benefit of and priority to International Application No. PCT/CN2016/101126 entitled "BRIDGED MICRO LOUVERS FOR ACTIVE PRIVACY SCREEN" filed Sep. 30, 2016, which are hereby incorporated by reference in their entireties.

TECHNICAL FIELD

Embodiments herein generally relate to display devices and particularly to active privacy screens for display devices.

BACKGROUND

In computer systems, a display device may be used to display various image content. In some cases, a display device may include a touch screen, wherein tactile input can be received at the display device. Detachable privacy screens are sometimes used at display devices to restrict propagation direction of light emitted from the display device. In some cases, the use of privacy screens may inhibit or reduce functionality of a touch screen associated with the display device.

BRIEF DESCRIPTION OF THE DRAWINGS

FIGS. 2A-2B illustrate block diagrams of a display device according to according to an embodiment.

FIGS. 6A-6B illustrates a block diagram of electrode plates for an electroactive privacy layer according to an embodiment.

FIG. 9 illustrates a logic flow for activating a privacy mode in an electroactive privacy layer according to an embodiment.

DETAILED DESCRIPTION

Figure 1:
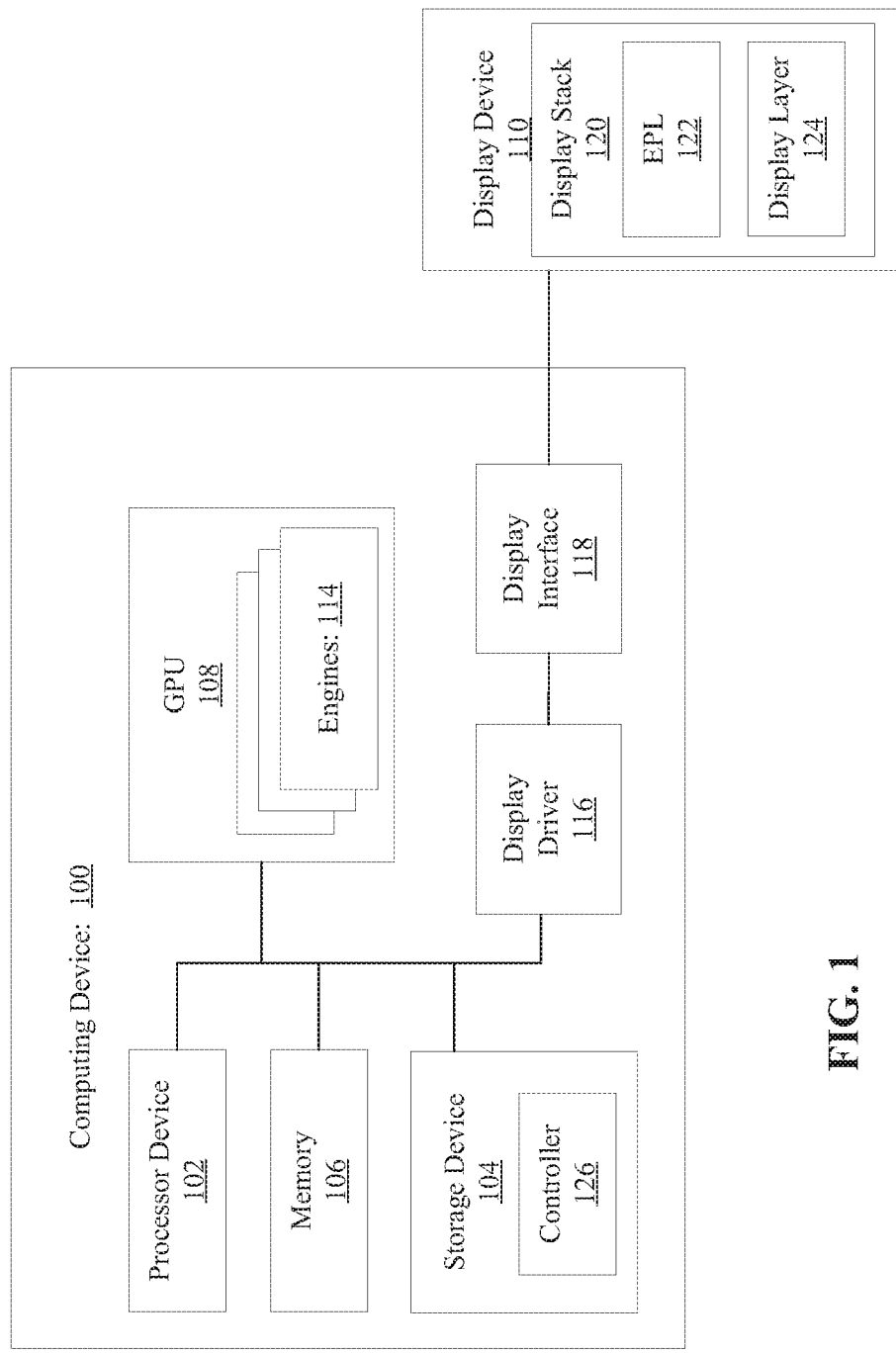
FIG. 1 illustrates a block diagram of a computing device and a display device including an electroactive privacy layer according to an embodiment.

Various embodiments described herein are generally directed to privacy at a display device. More specifically, a display device may include an electroactive privacy layer (EPL). As discussed above, in some cases a touch screen may be implemented within a display device. Generally, a touch screen may include components configured to enable interactions via touch, including touch using a stylus, a finger of a user, or the like. However, conventional privacy screens placed over a display device may reduce functionality of the touch screen. Additionally, conventional privacy screens incorporated into a display stack of a display device are not dynamic. That is, privacy mode is always enabled.

The present disclosure provides an EPL for a display stack of a display device. The EPL may restrict a direction of light propagating through the EPL when a "privacy mode" is selected but not restrict the direction of light propagating through the EPL when a "transparent mode" is selected. allow This is described in greater detail below. However, in general, a number of top electrodes and bottom electrodes may be provided in the EPL. Additionally, a dielectric material may be disposed between the top and bottom electrodes. The top and bottom electrodes may be configured to activate (or deactivate, as described in greater detail below) portions of the dielectric material to form micro louvers. The micro louvers may restrict a propagation direction of light emitted from the display stack (e.g., from a display layer of the display stack, or the like). More specifically, the micro louvers may absorb and diffuse light incident on the micro louvers (e.g., off-angle light emitted from the display layer) but not substantially interfere with light not incident on the micro louvers (e.g., on-angle light emitted from the display layer). Said differently, angled viewing of the display device may be restricted during the "privacy mode" due to the micro louvers absorbing and diffusing portions of the light emitted from the display layer while direct viewing of the display device may be uninhibited.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates a block diagram of a computing device 100 configured to initiate a restriction in light propagation associated with a display device. The computing device 100 may be, for example, a laptop computer, a desktop computer, an Ultrabook, a tablet computer, a mobile device, a server, a TV, a Smart-TV, a home automation device (e.g., a control panel, a thermostat, or the like), a wearable computing device (e.g., a watch, glasses, or the like), or the like. The computing device 100 may include a processor device 102 configured to execute stored instructions, as well as a storage device 104 including a non-transitory computer-readable medium, and a memory device 106.

The computing device 100 may also include a graphics processing unit (GPU) 108. In some cases, the GPU 108 is embedded in the processor device 102. In other cases, the GPU 108 may be a discrete component relative to the processor device 102. The GPU 108 may include a cache, and can be configured to perform any number of graphics operations within the computing device 100. For example, the GPU 108 may be configured to render or manipulate graphics images, graphics frames, videos, or the like, to be displayed to a user of the computing device 100 at a display device 110. Displaying image data may be carried out by one or more engines 114 of the GPU 108, a display driver 116, a display interface 118, and the like.

The display device 110 may be implemented as an external display device to the computing device 100, as an internal display device to the computing device 100, or any combination thereof. In any case, the display device may include a display stack 120 including a number of components arranged to form the display. For example, the display stack 120 may include at least an electroactive privacy layer (EPL) 122 and a display layer 124. The display stack 120 may also include other components, for example, a touch sensitive layer (e.g., refer to FIGS. 2A-2B). The display layer 124 may be a component of a display screen configured to emit light, such as a light emitting diode (LED) display, a liquid crystal display, an electronic paper display, an organic LED (OLED) display, a plasma display, or the like.

The EPL 122 may be composed of a number of top and bottom electrodes and a dielectric material disposed between the top and bottom electrodes. In some examples, the dielectric material may be optically anisotropic birefringence polymer, an electrically anisotropic dielectric polymer, or an optically anisotropic birefringence and electrically anisotropic dielectric polymer. Examples of the EPL 122 are given in greater detail below. In general, however, the EPL 122 may be configured to have a "privacy mode" and a "transparent mode." In particular, the micro louvers (refer to FIGS. 3A-3B) may be configured to turn "on" and "off" based on a voltage differential between the top and bottom electrodes to restrict a propagation direction of light emitted from the display layer 124 of the display stack 120.

In some cases, the EPL 122 may be controlled by a controller 126. The controller 126 may be implemented as circuitry, comprising a combination of logical elements. In other cases, the controller 126 may be implemented as a portion of software stored in the storage device 104, as software or firmware instructions of the display driver 116, the display interface 118, the engines 114 of the GPU 108, the processor device 102, any other suitable controller, or any combination thereof. The controller 126 may be configured to operate independently, in parallel, distributed, or as part of a broader process. In yet other cases, the controller 126 may be implemented as a combination of software, firmware, hardware logic, and the like. In general, the controller 126 may be configured to control the EPL 122 and to activate various modes (e.g., private mode, transparent mode, etc.) that are described in greater detail below. The controller may be operably coupled to a voltage source (e.g., refer to FIGS. 4A-4C and 5A-5B) and configured to send a control signal to the voltage source including an indication of an amount of voltage to be applied to portions (e.g., the electrodes discussed in greater detail below, etc.) of the EPL 122.

The memory device 106 can include random access memory (RAM), read only memory (ROM), flash memory, or any other suitable memory systems. For example, the memory device 106 may include dynamic random access memory (DRAM). The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems.

The processor device 102 may be a main processor that is adapted to execute the stored instructions. The processor device 102 may be a single core processor, a multi-core processor, a computing cluster, or any number of other configurations. The processor device 102 may be implemented as Complex Instruction Set Computer (CISC) or Reduced Instruction Set Computer (RISC) processors, x86 Instruction set compatible processors, multi-core, or any other microprocessor or central processing unit (CPU). The processor device 102 may be connected through a system bus 128 (e.g., Peripheral Component Interconnect (PCI), Industry Standard Architecture (ISA), PCI-Express, HyperTransport®, NuBus, etc.) to components including the memory 106 and the storage device 104. The processor device 102 may also be linked through the bus 128 to the display driver 116 and the display interface 118 and configured to connect the computing device 100 to the display device 110 via the display interface 118.

In some cases, the computing device 100 may be a mobile computing device. In some cases, the display device 110 may be a mobile display device to a mobile computing device. As noted above, the display device 110 may incorporated into the computing device 100 and/or may be separate from the computing device 100. Furthermore, it is noted, the display stack 120 may typically include many additional layers than those depicted here. For example, the display stack 120 may include various touch sensitive layer (e.g., capacitive, or the like), diffusive layers, pressure layers, tape layers, adhesive layers, light guide panel layers, backlight layers, etc. Examples are not limited in this context.

FIGS. 2A-2B illustrate block diagrams of a side view of an example embodiment of the display stack 120 during and transparent mode 202 and a private mode 204. In particular, FIG. 2A depicts the display stack 120 when the micro louvers are "off" (e.g., refer to FIG. 3A) thereby allowing both on-angle and off-angle light emitted from the display layer 124 to pass through the EPL layer 122 while FIG. 2B depicts the display stack 120 when the micro louvers are "on" (e.g., refer to FIG. 3B) thereby allowing on-angle light emitted from the display layer 124 to pass through the EPL layer 122 but inhibiting off-angle light emitted from the display layer 124 from passing through the EPL layer 122.

Turning more specifically to FIG. 2A, the display stack 120 is depicted with the display layer 124 disposed below the EPL layer 122. Additionally, a touch sensitive layer 210 is depicted. In particular, the touch sensitive layer 210 is depicted as part of the display stack 120 to illustrate how touch actions may not interfere with the EPL 122. More specifically, the EPL 122 may activate either privacy or transparent mode while still enabling touch features of the display device 110.

The display layer 124 is depicted including a light source 220. It is to be appreciated, that the display layer 120 and the light source 220 may correspond to a variety of different display technologies, such as, for example, OLED, backlit LCD, plasma, or the like. As such, the depiction herein of the light source 220 and the display layer 120 is not to be limiting, but is instead simplified to show on-angle light 222 and off-angle light 224 emitted from the display layer 120.

During the transparent mode 202, both the on-angle light 222 and the off-angle light 224 may pass through the EPL layer 122 substantially uninhibited. Furthermore, the touch screen functionality may also be substantially uninhibited.

Turning more specifically to FIG. 2B, the display stack 120 shown in FIG. 2A is depicted in the private mode 204. As depicted, the on-angle light 222 emitted from the display layer 120 and the light source 220 may pass through the EPL 122 while the off-angle light 224 may be inhibited from passing through the EPL 122. More specifically, the micro louvers may be configured to absorb and diffuse the off-angle light 224. As depicted, touch screen functionality may also be substantially uninhibited, even in private mode 204.

Figure 3A:
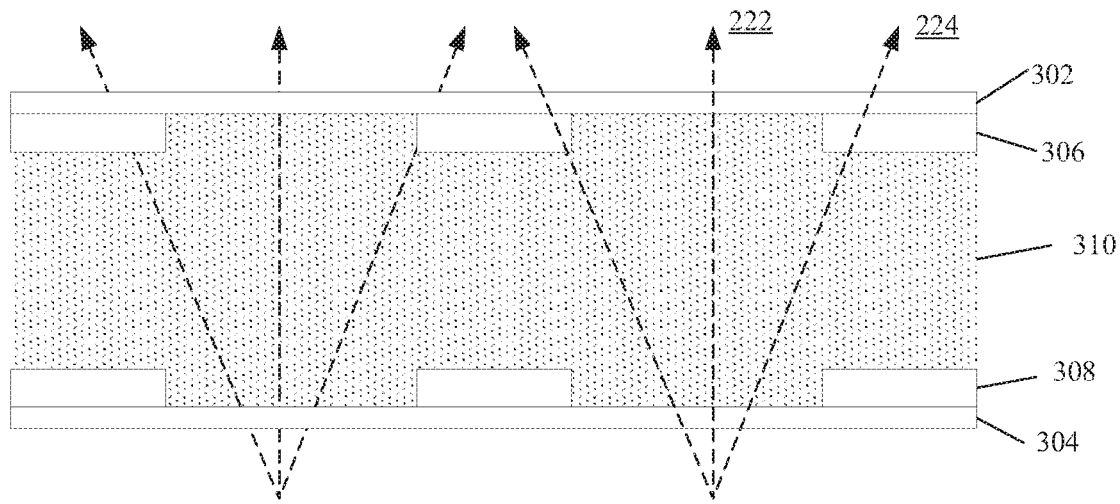
FIGS. 3A-3B illustrate block diagrams of an electroactive privacy layer according to an embodiment.
Figure 3B:
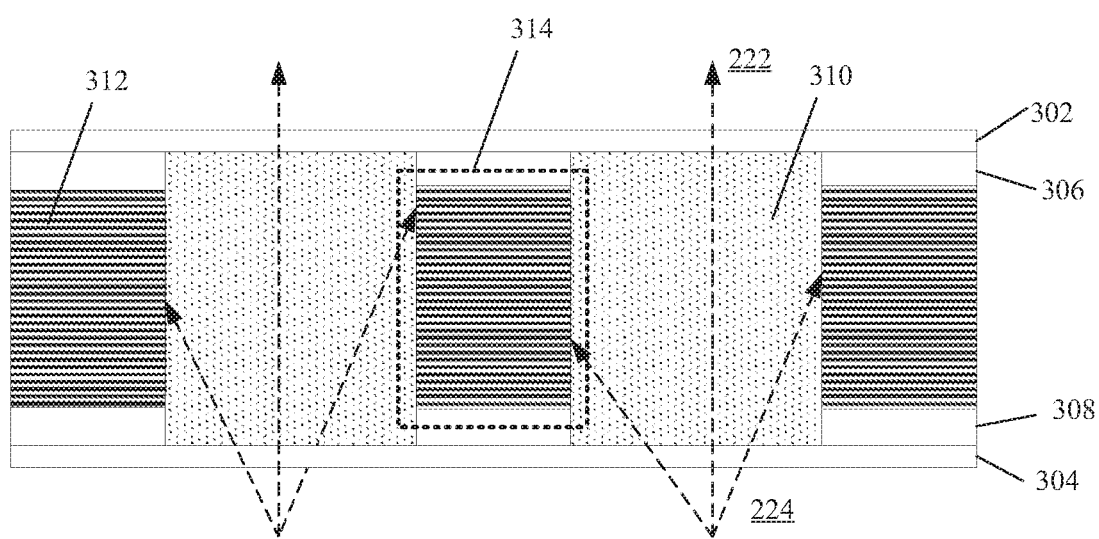

FIGS. 3A-3B illustrate block diagrams of a side view of an example embodiment of the EPL 122 during the transparent mode 202 and the private mode 204. In particular, FIG. 3A depicts the EPL 122 during the transparent mode 202 while FIG. 3B depicts the EPL 122 during the privacy mode 204. Turning more specifically to FIG. 3A, the EPL 122 includes a transparent top plate 302 and a transparent bottom plate 304. Additionally, the EPL 122 includes a number of top electrodes 306 and a number of bottom electrodes 308. It is noted, that the number of electrodes depicted in these figures are shown at a number to facilitate understanding and preserve clarity. However, in practice, an EPL, such as the EPL 122, may be implemented with any number of electrodes. Examples are not limited in this context. Furthermore, the EPL 122 includes dielectric material 310. The dielectric material 310 may comprise various polymers that can be switched to absorb and/or diffuse off-angle light incident on the portion of the polymer that is activated. For example, the dielectric material 310 may be optically anisotropic birefringence polymer, an electrically anisotropic dielectric polymer, or an optically anisotropic birefringence and electrically anisotropic dielectric polymer. In some examples, the polymer may be configured such that off-angle viewing of the display device results in a colored (e.g., gray, red, black, blue, or the like) display.

During the transparent mode 202, the dielectric material 310 is biased such that both on-angle light 222 and off-angle light 224 passes from the display layer (e.g., refer to FIGS. 2A-2B) through the EPL 122. Turning more specifically to FIG. 3B, during a privacy mode, the dielectric material 310 is biased to form micro louvers 312 between the top electrodes 306 and the bottom electrodes 308. More specifically, the portion 314 of the dielectric material 312 between the top electrodes 306 and the bottom electrodes 308 is biased to form an "optical wall" that absorbs and/or diffuses incident light to inhibit the transmission of off-angle light 224 through the EPL 122 while substantially not inhibiting the transmission of on-angle light 222 through the EPL 122.

In general, the dielectric material 310 may include a number of anisotropic birefringence material, such as, for example, liquid crystals, polymer-dispersed liquid crystals (not shown). This dielectric material has a normal state and an active state. In general, a magnetic field (e.g., resulting from a voltage differential, or a potential difference between the top electrodes 306 and the bottom electrodes 308) may cause the liquid crystals to twist (or untwist). Accordingly, a voltage may be applied to the EPL 122, and particularly, to the top electrodes 306 and the bottom electrodes 308, to cause a voltage differential to exists between the top and bottom electrodes. As a result, a magnetic field may be created between the electrodes to "bias" the dielectric material 310 into a desired state.

With some examples, the dielectric material 310 may have a normal, unbiased state that absorbs and diffuses all incident light (e.g., both on-angle light 222 and off-angle light 226). In some examples, the dielectric material 310 may have a normal, unbiased state that transmits all incident light (e.g., both on-angle light 222 and off-angle light 226). In general, an example EPL where the normal unbiased state of the dielectric material absorbs and diffuses all incident light is given with respect to FIGS. 4A-4C while an example EPL where the normal unbiased state of the dielectric material transmits all incident light is given with respect to FIGS. 5A-5C.

Figure 4A:
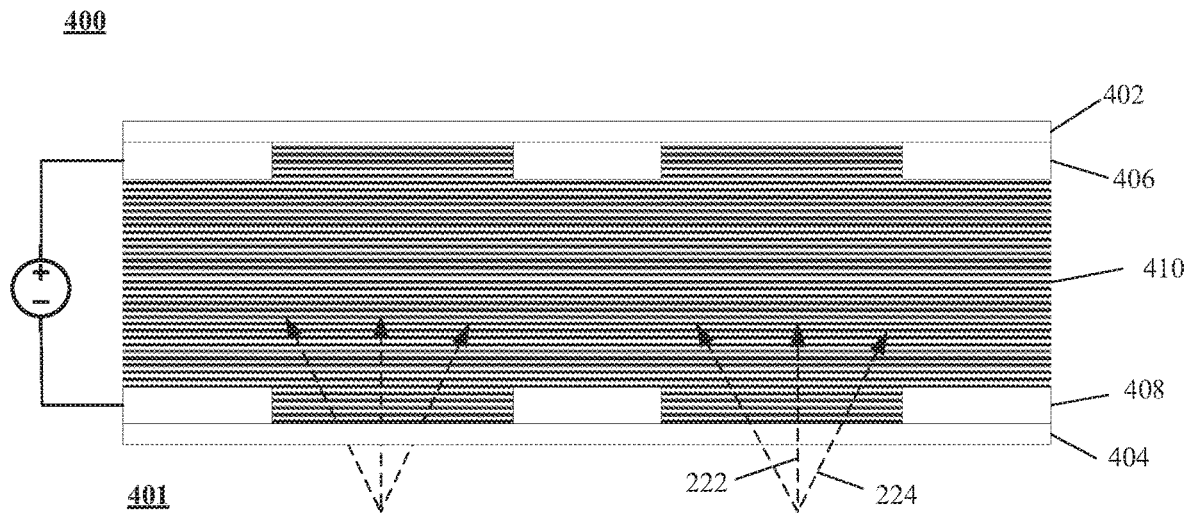
FIGS. 4A-4C illustrate block diagrams of an electroactive privacy layer according to another embodiment.

Turning more specifically to FIG. 4A, an example EPL 400 is depicted. In some examples, the EPL 400 may be implemented as the EPL 122 of the display device 110 described above. This figure depicts the EPL 400 in an off mode 401. As depicted, the EPL 400 has a voltage source 430 operably coupled to the top electrodes 406 and the bottom electrodes 408. Furthermore, EPL 400 includes dielectric material 410 with an unbiased state that absorbs and diffuses all incident light. Accordingly, when the voltage source 430 is "off," or that is, not applying voltage to the top electrodes 406 and bottom electrodes 408, the dielectric material 410 may remain in the unbiased state and thereby, absorb and diffuse all incident light (e.g., both on-angle light 222 and off-angle light 224). More specifically, the dielectric material 410 may be biased as described above such that substantially all portions of the dielectric material form micro louvers (e.g., 312, or the like).

Figure 4B:
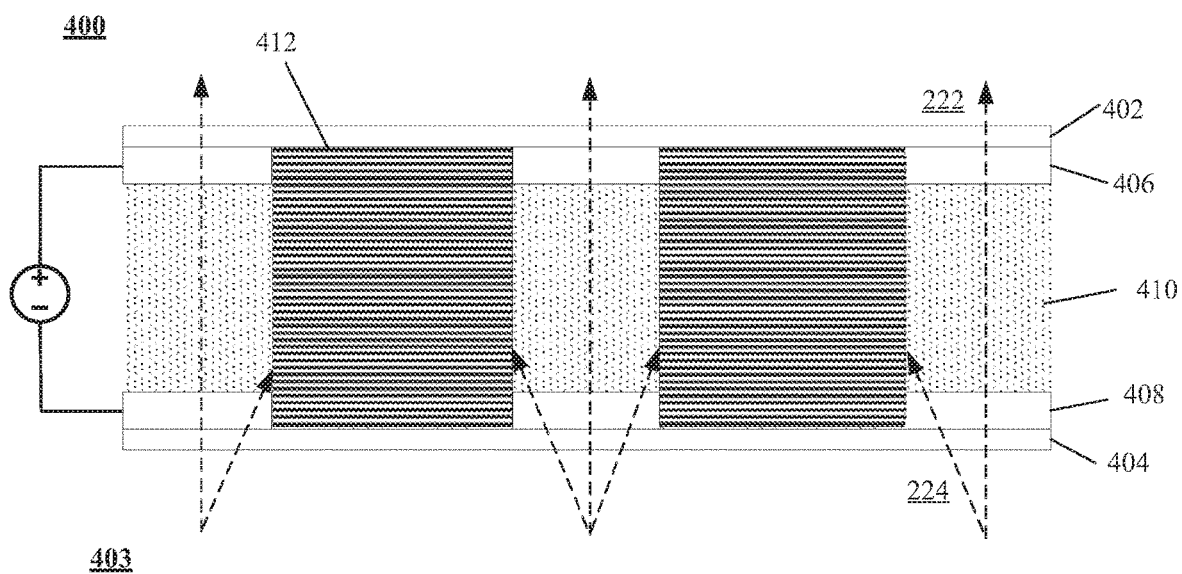

Turning to FIG. 4B, the EPL 400 is depicted in a privacy mode 403. The EPL 400 may be placed in the privacy mode 403 by the voltage source 430 applying voltage to the electrodes to create a potential difference between them, thereby creating a magnetic field strong enough to bias (e.g., twist) the dielectric material 410 between the top electrodes 406 and the bottom electrodes 408. As such, micro louvers 412 are formed along the EPL 400. More particularly, portions of the dielectric material not located between the electrodes remains in the normal unbiased state while portions of the dielectric material between the electrodes are biased. As such, the micro louvers 412 are realized. The micro louvers 412 absorb and diffuse light incident on the micro louvers 412. As such, on-angle light 222 is transmitted through the EPL 400 while off-angle light 224 is absorbed and diffused by the micro louvers 412.

Figure 4C:
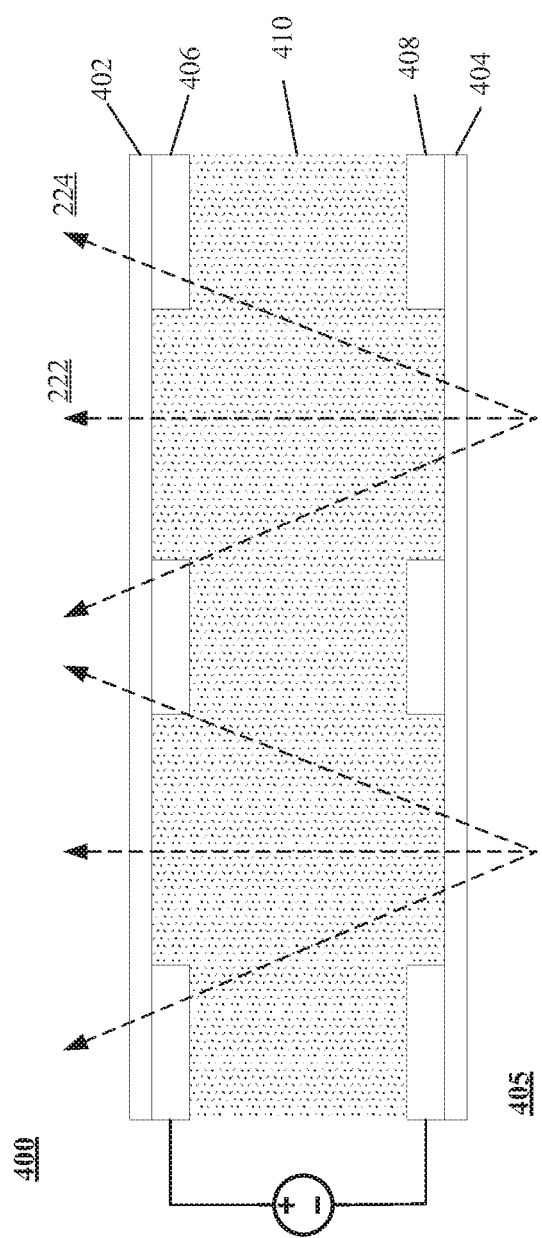

Turning to FIG. 4C, the EPL 400 is depicted in a transparent mode 405. The EPL 400 may be placed in the transparent mode 405 by the voltage source 430 applying voltage to the electrodes to create a potential difference between them, thereby creating a magnetic field strong enough to bias (e.g., twist) the liquid crystals within the dielectric material 410 between the top electrodes 406 and the bottom electrodes 408 as well as the dielectric material 410 located horizontally to the electrodes. Said differently, a sufficiently strong voltage is applied to the electrodes to cause all the dielectric material 410 to be biased. As such, no micro louvers 412 are created along the EPL 400. Said differently, substantially all of the dielectric material 410 is biased to transmit light. Accordingly, both on-angle light 222 and off-angle light 224 is transmitted through the EPL 400.

As noted above, the controller 126 may be coupled to the voltage source 430 and configured to send a control signal to the voltage source 430 to cause the voltage source 430 to create a potential different (e.g., voltage potential, etc.) between the top electrodes 406 and the bottom electrodes 408. In some examples, the controller 126 may be configured to activate privacy mode 403 or transparent mode 405 based on the presence of one or more conditions. The conditions may include stored user settings, content of images to be displayed at the display device 110, contextual data indicating an environment within which the display device 110 is disposed, or the like. For example, some image content may be marked as private and the controller 126 may activate the privacy mode 403 of the EPL 400 may be activated when it is to be displayed at the display layer 124. In some cases, certain applications may be associated with image content that is desired to be privately viewed. In this scenario, the privacy mode 403 may be activate during an entire period a given application is open. Further, in some cases, an environment of the display device 110 may include many people, and the privacy mode 403 may be activated to preserve privacy of the images being displayed. Detection of contextual data of the environment may be done by various sensors, such as ambient light sensors, cameras, thermometers, and the like, or any other software or firmware operations capable of detecting contextual data. In yet other cases, a user profile may indicate a preference for when to activate the privacy mode 403 or the transparent mode 405 based on any combination of the conditions described above.

For example, for the ELP 400, privacy mode 403 corresponds to a lower amount of current requirement than does transparent mode 405. As such, the privacy mode 403 may be activated as a default and the transparent mode 405 only activated based on one or more conditions (e.g., user selection, detection of off-angle users, detection of specific media or images to be displayed, or the like).

Figure 5A:
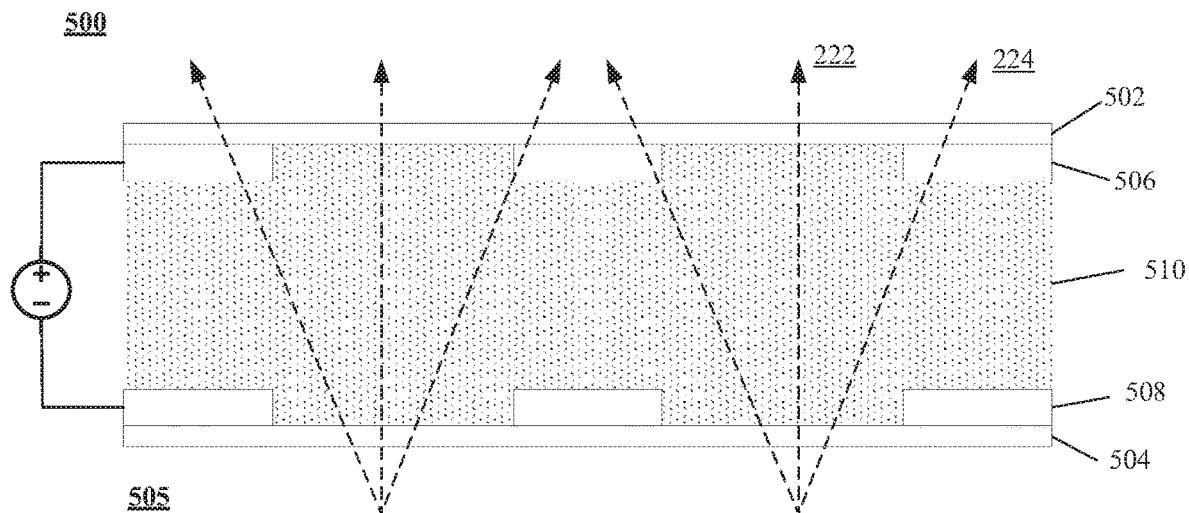
FIGS. 5A-5B illustrate block diagrams of an electroactive privacy layer according to yet another embodiment.

As noted, with some examples, an EPL may be provided where the normal unbiased state of the dielectric material transmits all incident light. Turning more specifically to FIG. 5A, the EPL 500 is depicted. In some examples, the EPL 500 may be implemented as the EPL 122 of the display device 110 described above. This figure depicts the EPL 500 in transparent mode 505. As depicted, the EPL 500 has a voltage source 530 operably coupled to the top electrodes 506 and the bottom electrodes 508. Furthermore, EPL 500 includes dielectric material 510 with an unbiased state that transmits all incident light. Accordingly, when the voltage source 530 is "off," or that is, not applying voltage to the top electrodes 506 and bottom electrodes 508, the crystals in the dielectric material 410 may remain in the unbiased state and thereby, transmit all incident light (e.g., both on-angle light 222 and off-angle light 224).

Figure 5B:
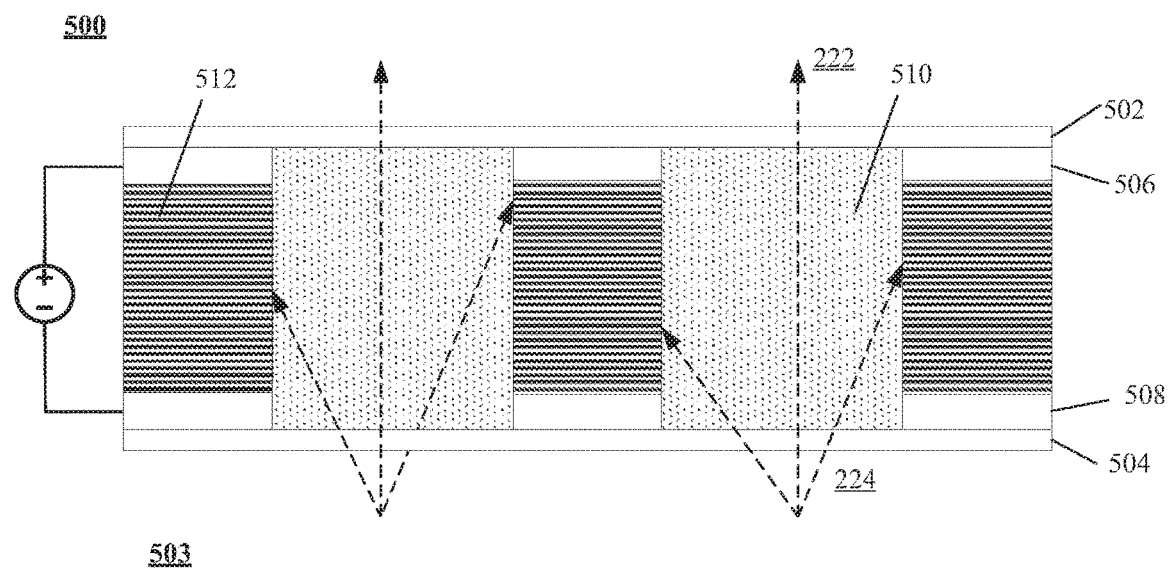

Turning more specifically to FIG. 5B, the EPL 500 is depicted in a privacy mode 503. The EPL 500 may be placed in the privacy mode 503 by the voltage source 530 applying voltage to the electrodes to create a potential difference between them, thereby creating a magnetic field strong enough to bias (e.g., twist) the dielectric material 510 between the top electrodes 506 and the bottom electrodes 508. As such, micro louvers 512 are created along the EPL 500. More particularly, portions of the dielectric material located between the electrodes are activated (e.g., biased, twisted, etc.) to form the micro louvers 512. The micro louvers 512 absorb and diffuse light incident on the micro louvers 512. As such, on-angle light 222 is transmitted through the EPL 500 while off-angle light 224 is absorbed and diffused by the micro louvers 512.

Figure 6B:
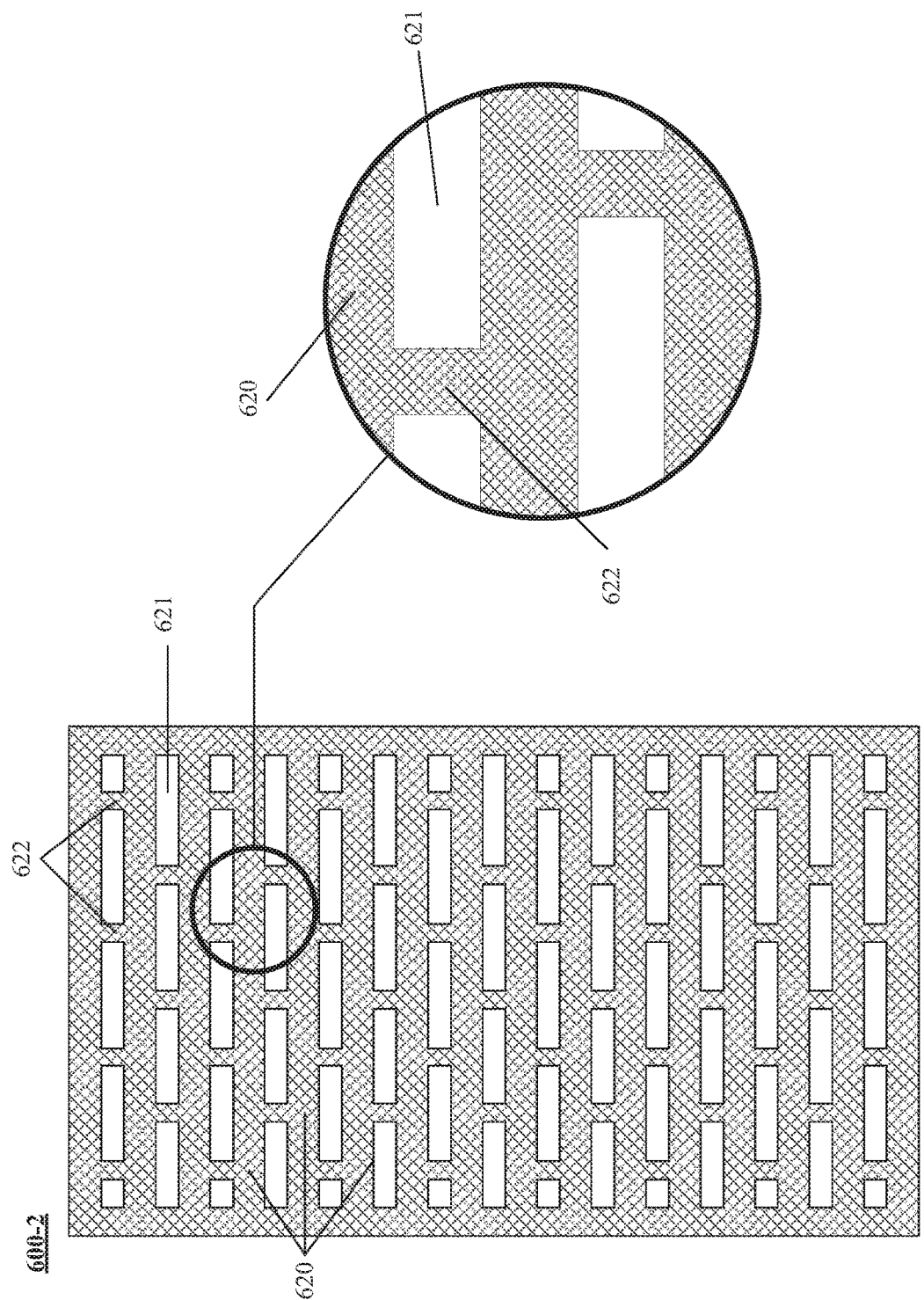
Figure 7A:
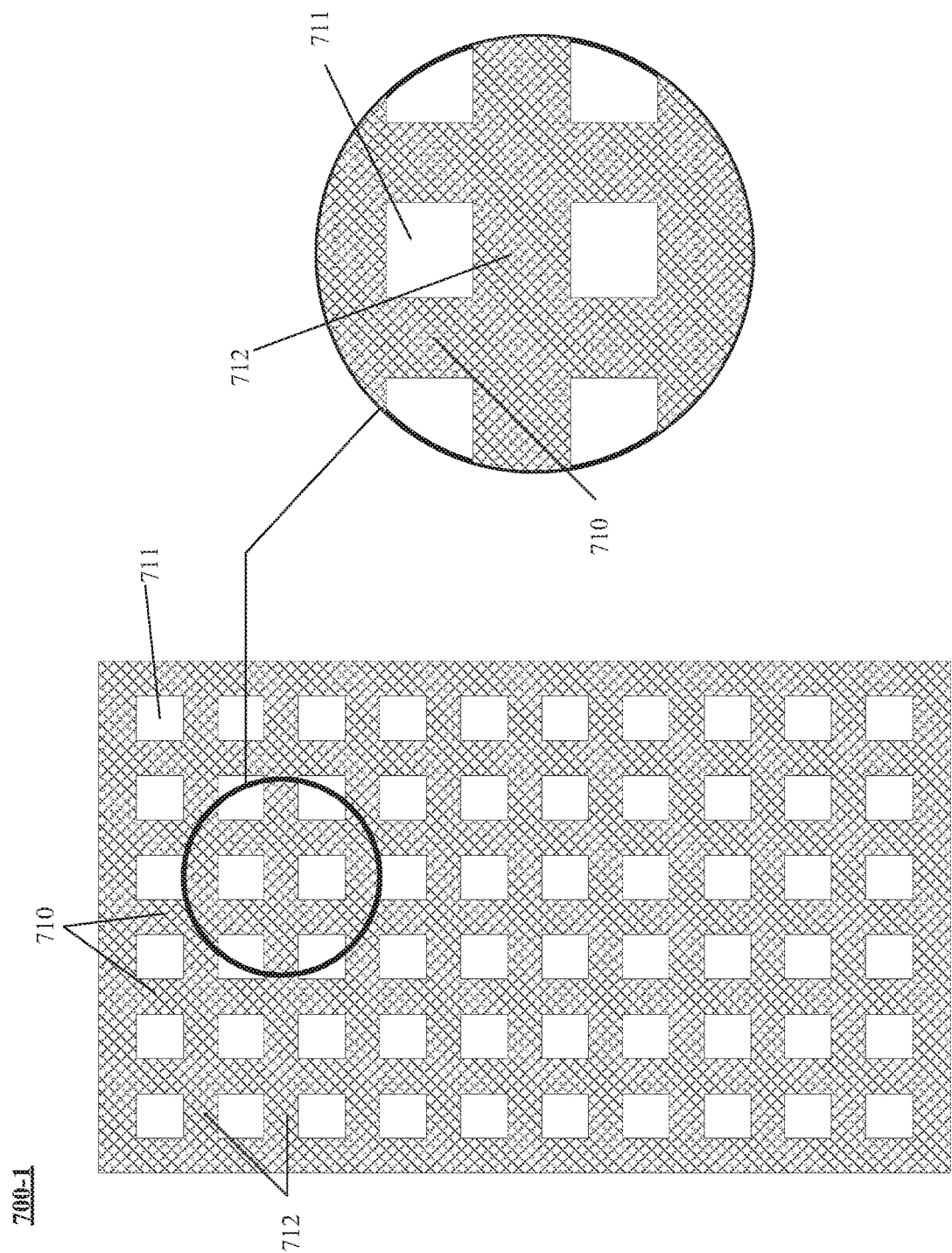
FIGS. 7A-7B illustrates a block diagram of electrode plates for an electroactive privacy layer according to another embodiment.
Figure 7B:
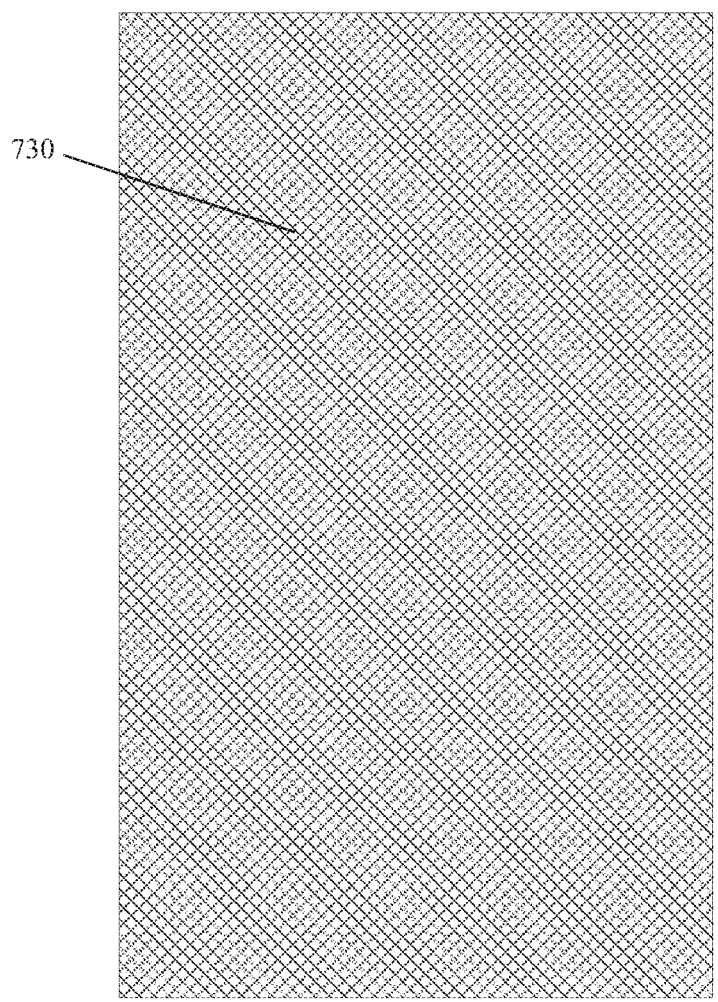
Figure 8A:
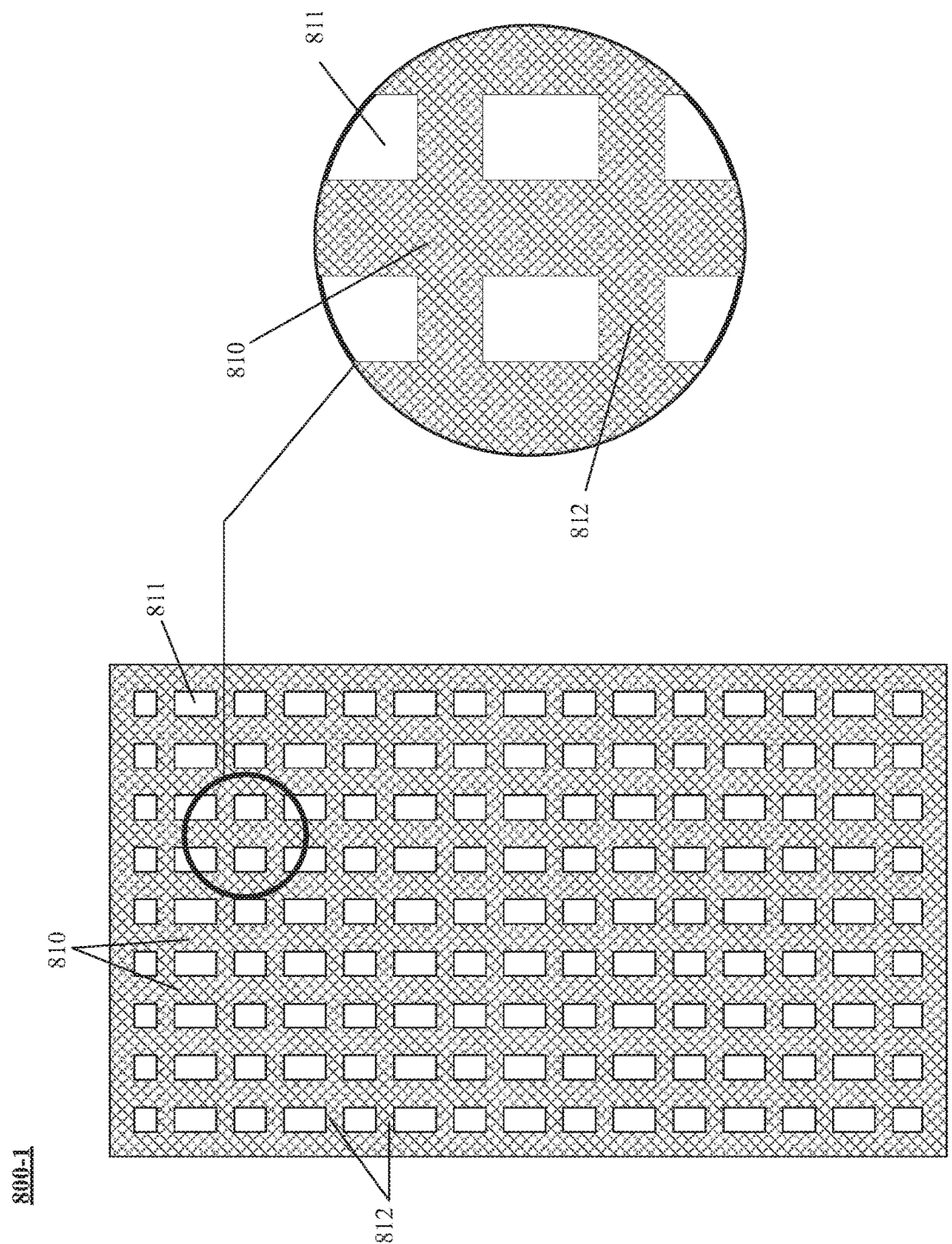
FIGS. 8A-8B illustrates a block diagram of electrode plates for an electroactive privacy layer according to yet another embodiment.
Figure 8B:
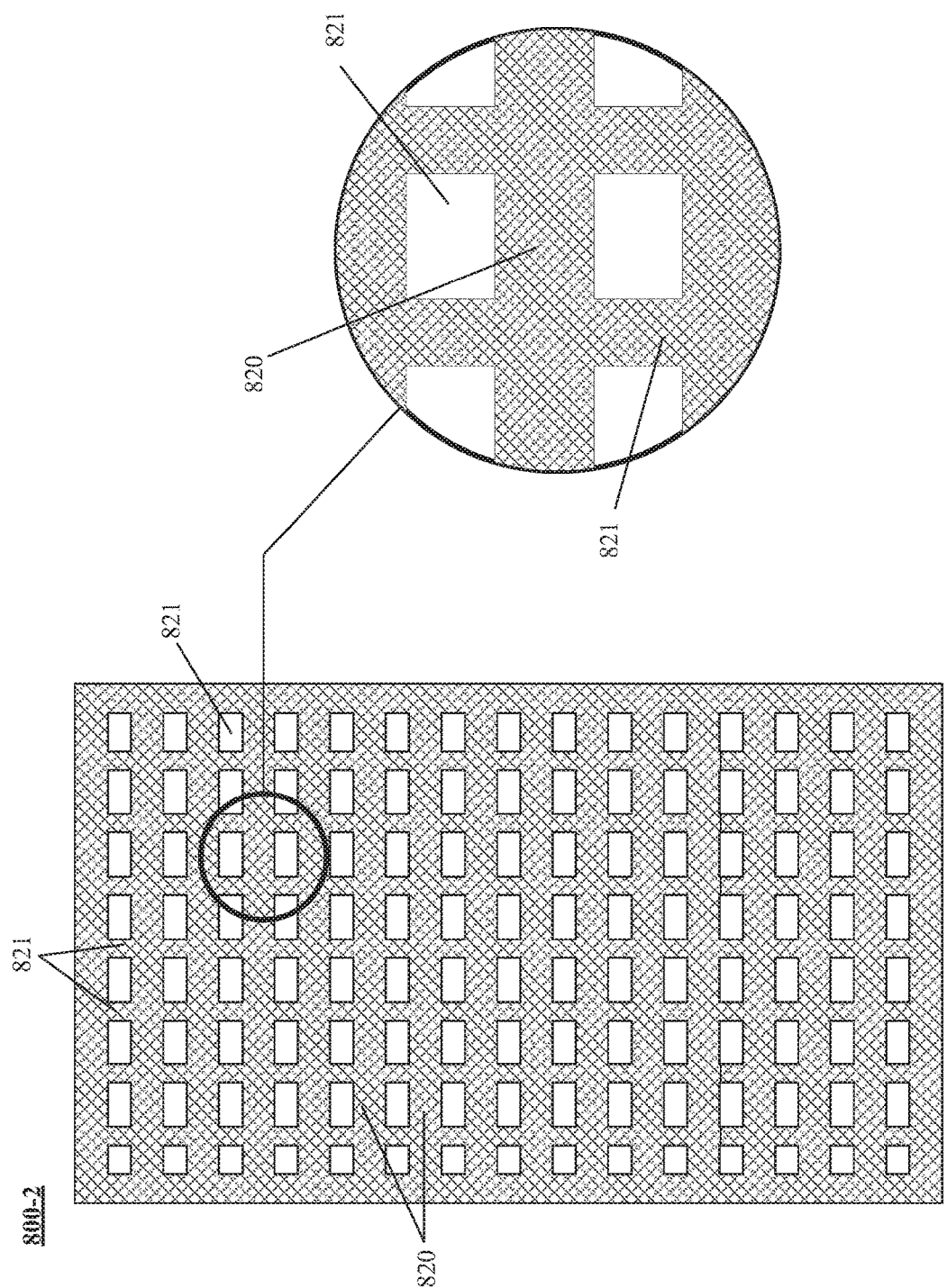

FIGS. 6A-6B, 7A-7B and 8A-8B illustrates block diagrams of top views of example electrode plate pairs that can be implemented to form electrodes in EPLs. For example, the depicted electrode plate pairs can be implemented to form electrodes for EPLs 122, 400 or 500. More specifically, one plate from a plate pair can be implemented as one of the top or bottom electrodes while the other plate from the pair can be implemented as the other top or bottom electrode. FIGS. 6A-6B depict an example plate pair 600 comprising patterned electrodes and associated bridges; FIGS. 7A-7B depict an example plate pair 700 comprising a patterned top electrode and solid bottom electrode; and FIGS. 8A-8B depicts an example plate pair 800 comprising patterned electrodes and bridges. It is noted, that the plate pairs are depicted without voltage conductors for purposes of clarity. However, it is noted that voltage conductors can be provides to apply a voltage potential to the depicted electrodes. In some examples, the top plate of a plate pair can comprise driving electrodes while the bottom plate of a plate pair can comprise common electrodes. In other examples, the top plate of a plate pair can comprise common electrodes while the bottom plate of a plate pair can comprise driving electrodes. Furthermore, in some examples, a voltage input conductors and a common voltage conductor can be provided on one plate while the other plate is electrically coupled to one of the voltage conductors (e.g., driving, common, or the like) through a separate conductor (e.g., a through via, or the like). Additionally, plates in a pair can be provided with electrodes disposed parallel, or perpendicular, to the electrodes of each plate. Examples are not limited in this context.

Turning more particularly to FIG. 6A, a first plate 600-1 of plate pair 600 is depicted including electrodes 610. As depicted, the electrodes 610 are disposed parallel to each other, but spaced apart a specified distance 611. Additionally, the electrodes 610 are periodically electrically coupled via bridges 612. In general, bridges 612 provide a more uniform resistance difference across the entire plate as opposed to unbridged electrodes, (e.g., electrodes 610 without bridges 612).

Turning more particularly to FIG. 6B, a second plate 600-2 of plate pair 600 is depicted including electrodes 620. As depicted, the electrodes 620 are disposed parallel to each other, but spaced apart a specified distance 621. Additionally, the electrodes 610 are periodically electrically coupled via bridges 622. In general, bridges 622 provide a more uniform resistance difference across the entire plate as opposed to unbridged electrodes (e.g., electrodes 620 without bridges 622).

In some examples, plates 600-1 and 600-2 can be formed via an electrode patterning process (e.g., lithographic process, etching process, or the like) to form electrodes 610 and 620, respectively. The electrodes 610 and/or 620 as well as the bridges 612 and/or 622 can be formed from a variety of transparent conductive materials, such as, for example, ITO, AgNW, or the like.

In some examples, a plate pair can be provided with one plate having a set of patterned electrode and bridges and the other plate having a single transparent electrode. Turning more particularly to FIG. 7A, a first plate 700-1 of plate pair 700 is depicted including electrodes 710. As depicted, the electrodes 710 are disposed parallel to each other, but spaced apart a specified distance 711. Additionally, the electrodes 710 are periodically electrically coupled via bridges 712. In general, bridges 712 provide a more uniform resistance difference across the entire plate as opposed to unbridged electrodes, (e.g., electrodes 710 without bridges 712). In some examples, electrodes 710 and bridges 712 of plate 700-1 can be formed via an electrode patterning process (e.g., lithographic process, etching process, or the like).

Turning more particularly to FIG. 7B, a second plate 700-2 of plate pair 700 is depicted including a single solid transparent electrode 730. In some examples, plate pair 700 can be provided to reduce or eliminate degradation of display characteristics due to overlapping electrodes and bridges. For example, plate pair 700 can be provided to increase a light intensity or reduce image blurring due to misalignment of electrodes and bridges during manufacturing or assembly of a display comprising the plate pair.

In some examples, a plate pair can be provided with each plate having a set of patterned electrode and bridges. Turning more particularly to FIG. 8A, a first plate 800-1 of plate pair 800 is depicted including electrodes 810. As depicted, the electrodes 810 are disposed parallel to each other, but spaced apart a specified distance 811. Additionally, the electrodes 810 are periodically electrically coupled via bridges 812. In general, bridges 812 provide a more uniform resistance difference across the entire plate as opposed to unbridged electrodes, (e.g., electrodes 810 without bridges 812). In some examples, electrodes 810 and bridges 812 of plate 800-1 can be formed via an electrode patterning process (e.g., lithographic process, etching process, or the like).

Turning more particularly to FIG. 8B, a second plate 800-2 of plate pair 800 is depicted including electrodes 820. As depicted, the electrodes 820 are disposed parallel to each other, but spaced apart a specified distance 821. Additionally, the electrodes 820 are periodically electrically coupled via bridges 822. In general, bridges 822 provide a more uniform resistance difference across the entire plate as opposed to unbridged electrodes, (e.g., electrodes 820 without bridges 822). In some examples, electrodes 820 and bridges 822 of plate 800-1 can be formed via an electrode patterning process (e.g., lithographic process, etching process, or the like). In some examples, electrodes 820 and bridges 822 of plate 800-2 can be formed via an electrode patterning process (e.g., lithographic process, etching process, or the like).

FIG. 9 illustrates a logic flow 900 for configuring a privacy mode or a transparent mode of a display device including an EPL as described herein. In some examples, the method 900 may be implemented by the controller 126 described above. However, embodiments are not limited in this context. The logic flow 900 may begin at block 910. At block 1210 "identify a condition to activate a privacy mode or a transparent mode of a display device," the controller 126 may identify a condition, such as, displayed media and a corresponding privacy mode or transparent mode desired for the displayed media.

Continuing to block 920 "send a control signal, based on the identified condition, to a voltage source to cause the voltage source to apply a voltage to first electrodes disposed parallel to each other and electrically coupled at a plurality of points via a number of bridges to create a potential difference between the first electrodes and a second electrode, the first electrodes and the second electrode disposed in an electroactive privacy layer of a display device, the potential difference to form a plurality of micro louvers in a dielectric material disposed between the first electrodes and the second electrode, the plurality of micro louvers to restrict a propagation direction of light emission associated with the display device," the controller may send a control signal to a voltage source (e.g., the voltage source 430, 530, or the like). The control signal to include an indication to apply voltage to electrodes in the EPL to cause the EPL to form (or not form as may be the case) micro louvers.

Figure 10:
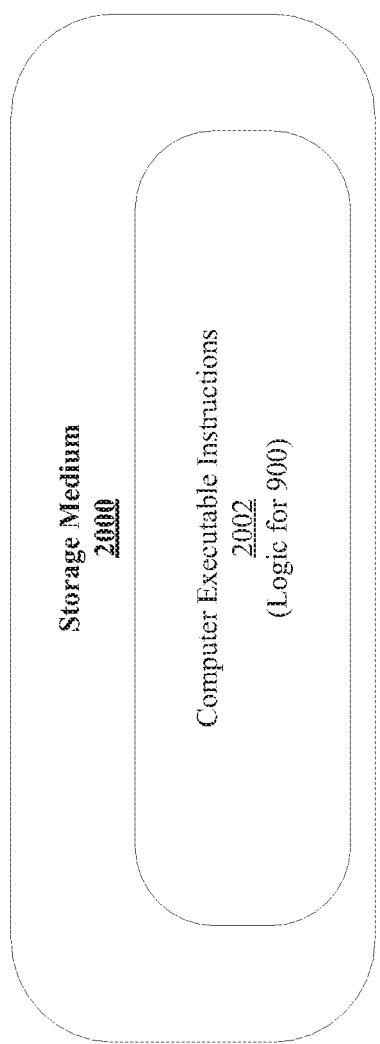
FIG. 10 illustrates a computer readable medium according to an embodiment.

FIG. 10 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 900.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
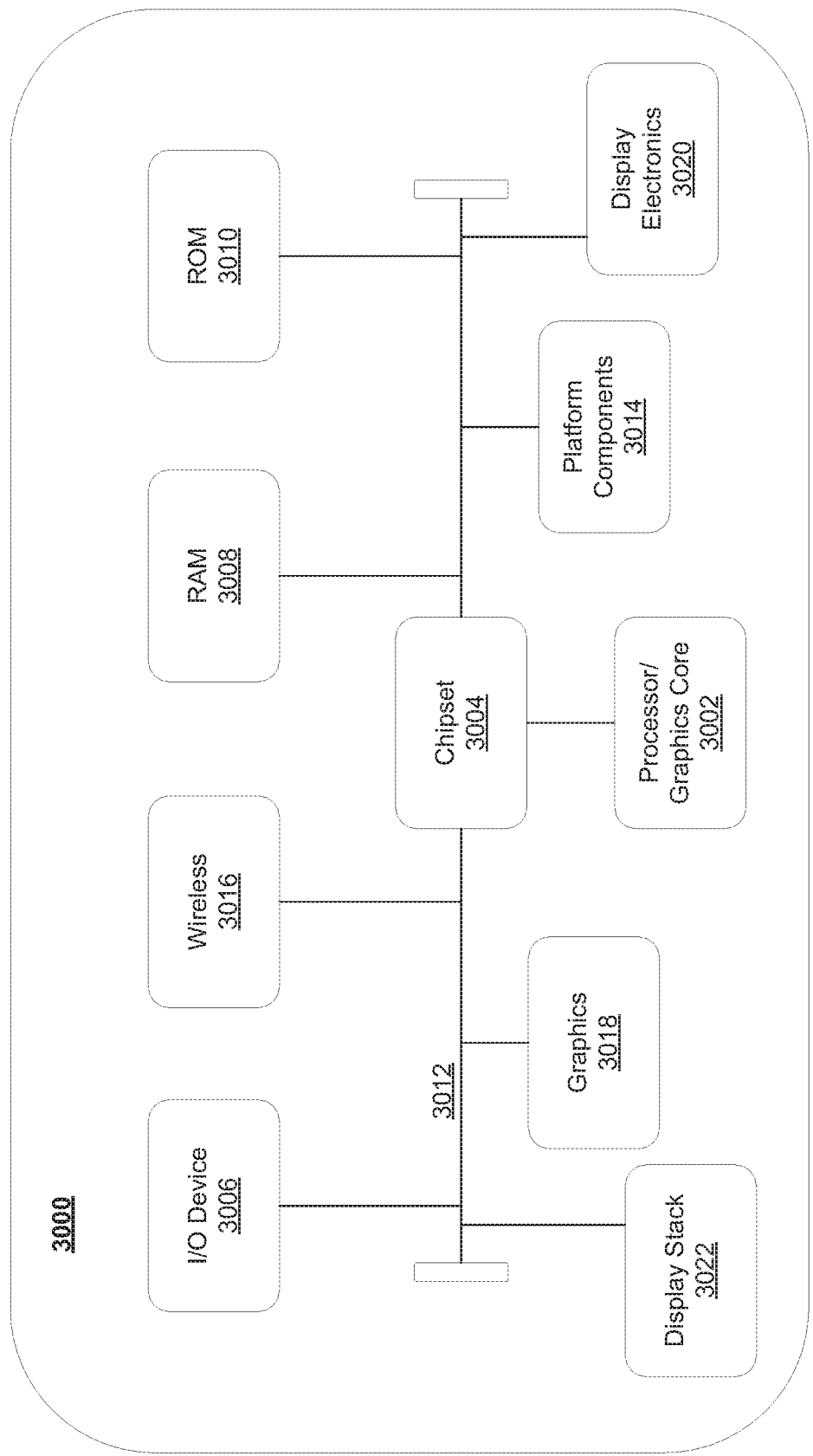
FIG. 11 illustrates a device according to an embodiment.

FIG. 11 is a diagram of an exemplary system embodiment and in particular, depicts a platform 3000, which may include various elements. For instance, this figure depicts that platform (system) 3000 may include a processor/graphics core 3002, a chipset (chipset) 3004, an input/output (I/O) device 3006, a random access memory (RAM) (such as dynamic RAM (DRAM)) 3008, and a read only memory (ROM) 3010, display electronics 3020, display 3022 (e.g., including an EPL, the EPL 122, the EPL 400, the EPL 500, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements. In some examples, platform 3000 can be implemented as a System-on-Chip (SoC).

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1

An apparatus for a display stack of an active privacy screen display, the apparatus comprising: a plurality of top electrodes; a plurality of top bridges, each one of the plurality of top bridges to electrically couple at least two of the plurality of top electrodes at a point along a length of the at least two of the plurality of top electrodes; at least one bottom electrode; and a dielectric material disposed between the plurality of top electrodes and the at least one bottom electrode, the plurality of top electrodes and the at least one bottom electrode to activate portions of the dielectric material to form a plurality of micro louvers, the plurality of micro louvers to restrict a propagation direction of light emission associated with the display device.

Example 2

The apparatus of example 1, the plurality of micro louvers to absorb light incident on the plurality of micro louvers, to scatter light incident on the plurality of micro louvers, or to absorb and scatter light incident on the plurality of micro louvers.

Example 3

The apparatus of example 1, the electroactive privacy layer comprising: a transparent top plate, the plurality of top electrodes disposed on the transparent top plate; and a transparent bottom plate, the at least one bottom electrode disposed on the transparent bottom plate, the dielectric material disposed between the transparent top plate and the transparent bottom plate.

Example 4

The apparatus of example 1, comprising: a plurality of bottom electrodes, the at least one bottom electrode one of the plurality of bottom electrodes; and a plurality of bottom bridges, each one of the plurality of bottom bridges to electrically couple at least two of the plurality of bottom electrodes at a point along a length of the at least two of the plurality of bottom electrodes.

Example 5

The apparatus of example 4, the plurality of top electrodes disposed substantially parallel to each other in a first direction and the plurality of bottom electrodes disposed substantially parallel to each other in a second direction.

Example 6

The apparatus of example 5, the first direction substantially parallel to the second direction.

Example 7

The apparatus of example 6, the first direction substantially perpendicular to the second direction.

Example 8

The apparatus of any one of examples 1 to 7, the dielectric material an ultraviolet light curable solid material.

Example 9

The apparatus of any one of examples 1 to 7, comprising a seal disposed between the transparent top plate and the transparent bottom plate to retain the dielectric material between the transparent top plate and the transparent bottom plate.

Example 10

The apparatus of any one of examples 1 to 7, the dielectric material comprises electrically anisotropic dielectric polymer.

Example 11

The apparatus of any one of examples 1 to 7, the propagation direction corresponding to off-angle light emitted from a display stack of the display device.

Example 12

The apparatus of any one of examples 1 to 7, comprising: a power supply operably coupled to the plurality of top and the plurality of bottom electrodes; and a controller, the controller to send a control signal to the power supply to cause the power supply to create a voltage differential between the plurality of top electrodes and the plurality of bottom electrodes, the voltage differential to activate the portions of the dielectric material to form the plurality of micro louvers.

Example 13

The apparatus of any one of examples 1 to 7, comprising a display stack.

Example 14

The apparatus of example 13, the display stack comprising one or more of a touch layer, a pressure layer, a protective layer, a liquid crystal display layer, a backlight layer, a light guide panel layer, and a display carrier layer.

Example 15

A system, comprising: a display stack for a display device, the display stack comprising: an electroactive privacy layer comprising: a plurality of top electrodes; a plurality of top bridges, each one of the plurality of top bridges to electrically couple at least two of the plurality of top electrodes at a point along a length of the at least two of the plurality of top electrodes; at least one bottom electrode; and a dielectric material disposed between the plurality of top electrodes and the at least one bottom electrode, the plurality of top electrodes and the at least one bottom electrode to activate portions of the dielectric material to form a plurality of micro louvers, the plurality of micro louvers to restrict a propagation direction of light emission associated with the display device.

Example 16

The system of example 15, the display stack comprising a display layer disposed below the electroactive privacy layer, the plurality of micro louvers to restrict the propagation direction of light emitted from the display layer.

Example 17

The system of example 16, the propagation direction corresponding to off-angle light emitted from the display layer.

Example 18

The system of example 15, the plurality of micro louvers to absorb light incident on the plurality of micro louvers, to scatter light incident on the plurality of micro louvers, or to absorb and scatter light incident on the plurality of micro louvers.

Example 19

The system of example 15, the electroactive privacy layer comprising: a transparent top plate, the plurality of top electrodes disposed on the transparent top plate; and a transparent bottom plate, the at least one bottom electrode disposed on the transparent bottom plate, the dielectric material disposed between the transparent top plate and the transparent bottom plate.

Example 20

The system of example 15, comprising: a plurality of bottom electrodes, the at least one bottom electrode one of the plurality of bottom electrodes; and a plurality of bottom bridges, each one of the plurality of bottom bridges to electrically couple at least two of the plurality of bottom electrodes at a point along a length of the at least two of the plurality of bottom electrodes.

Example 21

The system of example 20, the plurality of top electrodes disposed substantially parallel to each other in a first direction and the plurality of bottom electrodes disposed substantially parallel to each other in a second direction.

Example 22

The system of example 21, the first direction substantially parallel to the second direction or the first direction substantially perpendicular to the second direction.

Example 23

The system of example 15, the dielectric material comprises electrically anisotropic dielectric polymer.

Example 24

The system of any one of examples 15 to 23, comprising: a power supply operably coupled to the plurality of top and the plurality of bottom electrodes; and a controller, the controller to send a control signal to the power supply to cause the power supply to create a voltage differential between the plurality of top electrodes and the plurality of bottom electrodes, the voltage differential to activate the portions of the dielectric material to form the plurality of micro louvers.

Example 25

The system of any one of examples 15 to 23, the display stack comprising one or more of a touch layer, a pressure layer, a protective layer, a liquid crystal display layer, a backlight layer, a light guide panel layer, and a display carrier layer.

Example 27

At least one computer-readable storage medium comprising instructions that, when executed by a processor, cause the processor to: send a control signal to a voltage source to cause the voltage source to apply a voltage to a first plurality of electrodes to create a potential difference between the first plurality of electrodes and at least one second electrode, each of the first plurality of electrodes electrically coupled to another electrode of the plurality of electrodes along a length of the electrodes via a plurality of bridges, the first plurality of electrodes and the at least one second electrode disposed in an electroactive privacy layer of a display device, the potential difference to form a plurality of micro louvers in a dielectric material disposed between the first plurality of electrodes and the at least one second electrode, the plurality of micro louvers to restrict a propagation direction of light emission associated with the display device.

Example 28

The at least one computer-readable storage medium of example 27, the plurality of micro louvers to absorb light incident on the plurality of micro louvers, to scatter light incident on the plurality of micro louvers, or to absorb and scatter light incident on the plurality of micro louvers.

Example 29

The at least one computer-readable storage medium of example 27, the electroactive privacy layer comprising: a transparent top plate, the first plurality of electrodes disposed on the transparent top plate; and a transparent bottom plate, the at least one second electrode disposed on the transparent bottom plate, the dielectric material disposed between the transparent top plate and the transparent bottom plate.

Example 30

The at least one computer-readable of example 27, the electroactive privacy layer comprising: a plurality of bottom electrodes; and a plurality of bottom bridges, each one of the plurality of bottom bridges to electrically couple at least two of the plurality of bottom electrodes at a point along a length of the at least two of the plurality of bottom electrodes.

Example 31

The at least one computer-readable storage medium of example 29, the first plurality of electrodes disposed substantially parallel to each other in a first direction and the second plurality of electrodes disposed substantially parallel to each other in a second direction.

Example 32

The at least one computer-readable storage medium of example 31, the first direction substantially parallel to the second direction or the first direction substantially perpendicular to the second direction.

Example 33

The at least one computer-readable storage medium of example 27, the dielectric material comprises electrically anisotropic dielectric polymer.

Example 34

The at least one computer-readable storage medium of example 27, the propagation direction corresponding to off-angle light emitted from the display device.

Example 35

A method comprising: sending a control signal to a voltage source to cause the voltage source to apply a voltage to a first plurality of electrodes to create a potential difference between the first plurality of electrodes and at least one second electrode, each of the first plurality of electrodes electrically coupled to another electrode of the plurality of electrodes along a length of the electrodes via a plurality of bridges, the first plurality of electrodes and the at least one second electrode disposed in an electroactive privacy layer of a display device, the potential difference to form a plurality of micro louvers in a dielectric material disposed between the first plurality of electrodes and the at least one second electrode, the plurality of micro louvers to restrict a propagation direction of light emission associated with the display device.

Example 36

The method of example 35, the plurality of micro louvers to absorb light incident on the plurality of micro louvers, to scatter light incident on the plurality of micro louvers, or to absorb and scatter light incident on the plurality of micro louvers.

Example 37

The method of example 35, the electroactive privacy layer comprising: a transparent top plate, the first plurality of electrodes disposed on the transparent top plate; and a transparent bottom plate, the second plurality of electrodes disposed on the transparent bottom plate, the dielectric material disposed between the transparent top plate and the transparent bottom plate.

Example 38

The method of example 35, the electroactive privacy layer comprising: a plurality of bottom electrodes; and a plurality of bottom bridges, each one of the plurality of bottom bridges to electrically couple at least two of the plurality of bottom electrodes at a point along a length of the at least two of the plurality of bottom electrodes.

Example 39

The method of example 38, the first plurality of electrodes disposed substantially parallel to each other in a first direction and the second plurality of electrodes disposed substantially parallel to each other in a second direction.

Example 40

The method of example 39, the first direction substantially parallel to the second direction or the first direction substantially perpendicular to the second direction.

Example 41

The method of example 35, the dielectric material comprises electrically anisotropic dielectric polymer.

Example 42

The method of example 35, the propagation direction corresponding to off-angle light emitted from the display device.

Example 43

An apparatus comprising means to perform the method of any one of examples 35 to 42.

What is claimed is:

1. An apparatus for an electroactive privacy layer, comprising:
    a plurality of top electrodes;
    a first plurality of bridges to electrically couple a first top electrode and a second top electrode of the plurality of top electrodes at a point along a length of the first top electrode and the second top electrode;

a second plurality of bridges to electrically couple the second top electrode and a third top electrode of the plurality of top electrodes at a point along a length of the second top electrode and the third top electrode, wherein the first plurality of bridges and the second plurality of bridges are orthogonal to the plurality of top electrodes;

at least one bottom electrode; and a dielectric material disposed between the plurality of top electrodes and the at least one bottom electrode and arranged to be biased from a first state to a second state based on a voltage differential between the plurality of top electrodes and the at least one bottom electrode.

2. The apparatus of claim 1, the dielectric material to absorb incident light, to scatter incident light, or to absorb and scatter incident light in the first state.

3. The apparatus of claim 1, the dielectric material comprises electrically anisotropic dielectric polymer.

4. The apparatus of claim 1, the at least one bottom electrode comprising a transparent conductive material.

5. The apparatus of claim 4, the plurality of top electrodes and the at least one bridge comprising the transparent conductive material.

6. The apparatus of claim 5, the transparent conductive material comprising at least one of silver nanowire (AgNW) or indium-tin-oxide (ITO).

7. The apparatus of claim 1, comprising:
a plurality of bottom electrodes; and
at least one bottom bridge to electrically couple at least two of the plurality of bottom electrodes at a point along a length of the at least two of the plurality of bottom electrodes.

8. The apparatus of claim 7, the plurality of top electrodes disposed substantially parallel to each other in a first direction and the plurality of bottom electrodes disposed substantially parallel to each other in a second direction.

9. An apparatus for a privacy device, comprising:
a plurality of top electrodes;
a first plurality of bridges to electrically couple a first top electrode and a second top electrode of the plurality of top electrodes at a point along a length of the first top electrode and the second top electrode;
a second plurality of bridges to electrically couple the second top electrode and a third top electrode of the plurality of top electrodes at a point along a length of the second top electrode and the third top electrode, wherein the first plurality of bridges and the second plurality of bridges are orthogonal to the plurality of top electrodes; and
at least one bottom electrode, the plurality of top electrodes and the at least one bottom electrode arranged to bias a dielectric material from a first state to a second state based on a voltage differential between the plurality of top electrodes and the at least one bottom electrode.

10. The apparatus of claim 9, the dielectric material to absorb incident light, to scatter incident light, or to absorb and scatter incident light in the first state.

11. The apparatus of claim 9, the at least one bottom electrode comprising a transparent conductive material.

12. The apparatus of claim 11, the plurality of top electrodes and the at least one bridge comprising the transparent conductive material.

13. The apparatus of claim 12, the transparent conductive material comprising at least one of silver nanowire (AgNW) or indium-tin-oxide (ITO).

14. A system, comprising:
a voltage source; and
a privacy layer, comprising:
a plurality of top electrodes;
a first plurality of bridges to electrically couple a first top electrode and a second top electrode of the plurality of top electrodes at a point along a length of the first top electrode and the second top electrode;
a second plurality of bridges to electrically couple the second top electrode and a third top electrode of the plurality of top electrodes at a point along a length of the second top electrode and the third top electrode, wherein the first plurality of bridges and the second plurality of bridges are orthogonal to the plurality of top electrodes;
at least one bottom electrode; and
a dielectric material disposed between the plurality of top electrodes and the at least one bottom electrode and arranged to be biased from a first state to a second state based on a voltage differential between the plurality of top electrodes and the at least one bottom electrode.

15. The system of claim 14, the dielectric material to absorb incident light, to scatter incident light, or to absorb and scatter incident light in the first state.

16. The system of claim 14, the dielectric material comprises electrically anisotropic dielectric polymer.

17. The system of claim 14, the at least one bottom electrode comprising a transparent conductive material and the plurality of top electrodes and the at least one bridge comprising the transparent conductive material.

18. The system of claim 14, the voltage source comprising a power supply operate to couple to the plurality of top electrodes and the at least one bottom electrode and to apply the voltage differential between the plurality of top electrodes and the at least one bottom electrode.

* * * * *